June 25, 1963 D. S. SIKORA 3,095,502

RESETTABLE INFORMATION STORAGE DEVICE

Filed July 13, 1961

INVENTOR.
DONALD S. SIKORA
BY
N. Friedman
ATTORNEY

United States Patent Office 3,095,502

Patented June 25, 1963

3,095,502
RESETTABLE INFORMATION STORAGE DEVICE

Donald S. Sikora, Moorestown, N.J., assignor to Monroe Calculating Machine Company, Orange, N.J., a corporation of Delaware Filed July 13, 1961, Ser. No. 123,887
21 Claims. (Cl. 235—61.12)

The present invention pertains to information storage devices. More particularly, it has to do with resettable information storage devices.

One well-known type of information storage device comprises a record member in the form of a paper sheet such as a card or elongated strip of tape, on which information is stored in the form of side by side columns of encoded arrangements of punched holes. In a variant of the foregoing type of device, the holes rather than being completely punched out are in the form of an incomplete or open loop whereby a tab remains filling the hole. This latter form of punching is known in the art as "chadless" punching. However, in both the two aforesaid types of storage devices, once any given information has been stored on the record member by punching the latter, the punched information so recorded cannot be changed. For example, if any particular column of a blank punched card is punched to represent a particular item of information, it is not possible to subsequently vary the information stored in the column without resorting to cumbersome techniques such as affixing patches over the punched hole(s).

In many applications, however, it is useful if the information stored at a given location on the record member can be varied from time to time. For example, in accounting systems it is often desired that a previous old balance be stored on the ledger or statement sheet of an account in such fashion that it can conveniently be read automatically for use in subsequent posting operations on the given account. The newly computed balance can then be stored on the sheet for use in the next posting operation, and so on. Since known prior art techniques for storing information in the form of punchings and the like do not offer the flexibility of being able to readily reset the stored information, the art has turned to relatively complex and expensive alternatives such as magnetic recording which do offer such flexibility.

The present invention has as its major object the provision of an economically fabricated and easily usable resettable information storage device in which the information-representing condition at any given index point can easily be changed back and forth between "on" and "off" conditions.

It is a further object of the invention to provide a resettable information storage device in which there is provided a mechanical member at each index point position and in which said mechanical member is detented in either of its two selectable positions.

It is a further object to provide a resettable information storage device in which information can be stored and can be reset through the medium of prepunched columns of detented tabs, each tab being the basic unit of information storage.

It is a further object to provide a resettable information storage device of the above type which lends itself to economical fabrication from materials such as a heavy weight paper of the type used for ledger and statement sheets and punched cards.

As will be described in detail shortly, in a preferred embodiment the above and other objects of the invention are fulfilled by providing a record member with prepunched columns of tabs, there being a tab at every available index point. The tabs are cut at an oblique angle to the plane of the record member whereby a portion, preferably the outer or free end portion, of the tab and of the contiguous portion of the record member have parallel opposed beveled edges extending from one side of the record member to the other side thereof. Because of this bevel configuration, the edge of the record member includes a corner which lies in each tab's path of movement between two positions—one substantially coplanar with the record sheet and the other at an angle thereto. Accordingly, the corner is effective to detentably hold the tab in both the aforesaid positions. However, the detenting or blocking force exerted by the corner can readily be overcome by merely applying sufficient force to the tab to push it past the corner. One of these two positions of the tab is used as the active or information-representing condition of the tab and the other position as the inactive condition.

The present invention is an advance over prior art devices such as disclosed in the following United States patents: 2,207,379; 2,244,231; 2,315,737; 2,949,226.

Figure 1:
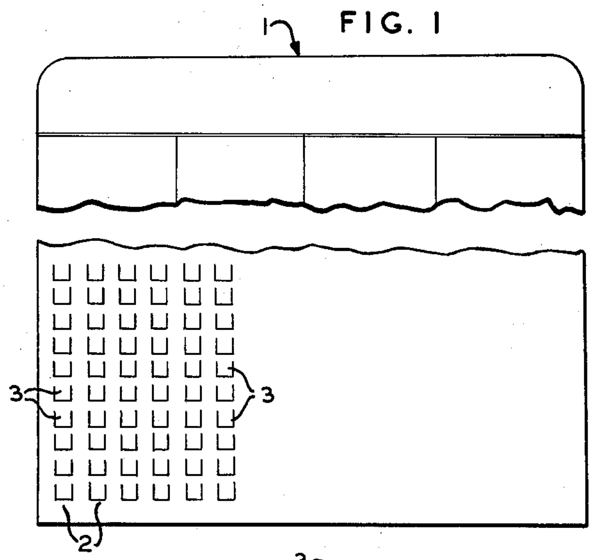
FIG. 1 is a top plan view of a ledger or statement sheet in which the invention is preferably embodied, showing the columns of prepunched information storage tabs.
Figure 2:
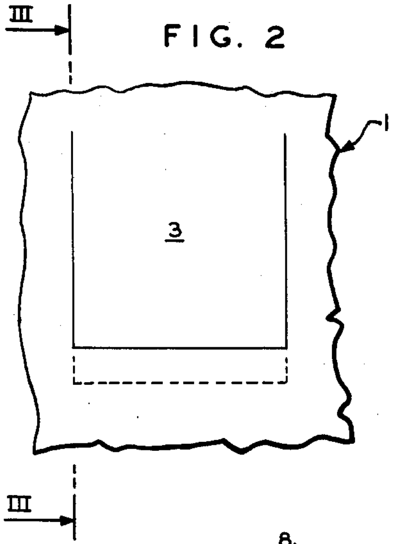
FIG. 2 is a greatly enlarged detail view of FIG. 1 showing one of the tabs.

Referring now to the drawings and particularly FIG. 1 thereof, the reference numeral 1 designates a ledger or statement sheet made of relatively stiff paper or the like on which any given account is adapted to be posted as by means of an accounting machine. Periodically, the account is posted by entering therein debits and credits to ascertain the current balance. Since each such periodic posting operation requires as a starting point the previous old balance, it is desirable that there be provision for automatically recording the last balance on the ledger sheet in such a form that it can readily be picked up automatically for the next periodic posting operation.

The present invention is particularly suited for meeting this need. In accordance with the invention, there is provided on the lower portion of the ledger sheet novel means whereby the old balance can be stored in encoded fashion and in which the information stored can be readily changed as desired.

Figure 4:
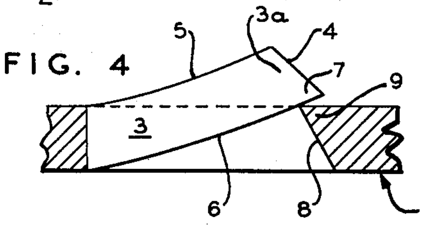
FIG. 4 is a view similar to FIG. 3 showing the tab detented in its other position at an angle to the sheet.
Figure 3:
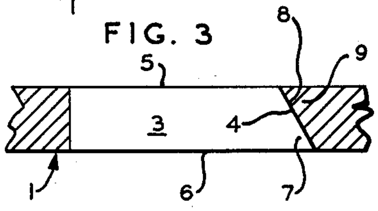
FIG. 3 is a sectional view taken on line III—III of FIG. 2 with the tab in its position substantially coplanar with the sheet.

In the preferred form of the invention, the information storage means comprises columns of prepunched tabs. Each column 2 of tabs 3 is adapted to store therein a single item of information, e.g., a selected digit. Ten prepunched tabs 3 are provided in each column 2, each tab corresponding to a different one of the digits 0–9. Each tab is adapted to assume either one of two possible positions. FIG. 3 shows one of these positions, wherein the tab lies substantially in the plane of sheet 1. This position will be referred to subsequently as coplanar position. FIG. 4 shows the other position of the tab. Here, the tab 3 has been pushed or otherwise moved to one side from its FIG. 3 position coplanar with sheet 1, to a position where the tab now extends at an oblique angle to sheet 1. This position will be referred to subsequently as angular position. It will be noted that in the angular position of FIG. 4, the forward or free end of portion 3*a* of the tab projects beyond the adjacent surface of record sheet 1.

Each tab and the contiguous portion of the sheet of which it is a part are so constructed that the tabs will be detented in either one of their two positions against movement to the other position. The structure which provides for this function will now be described. Each tab 3 is integral with the sheet 1, and is formed therein by prepunching, i.e., preslitting, the sheet at each index point position. Each such punching is in the form of an incomplete or open loop extending through the sheet to define the tab. As was briefly mentioned earlier a significant feature of the invention resides in the fact that at least a portion of the edge of the tab and the contiguous edge portion of the record member are correspondingly beveled or, in other words, extend in the same oblique angular direction. Preferably, it is the free, forward end portion 3*a* of the tab which is so beveled.

It will be seen that because of the oblique or beveled edge 4 formed on the tab, the upper side 5 thereof terminates short of the opposite side 6; and that the forward free end 3*a* of the tab includes an acute angled corner 7. Similarly, the adjacent correspondingly beveled edge 8 of the sheet 1 results in the latter having an acute angled corner 9 which extends inwardly, i.e., toward the hinge line or rear end of the tab, beyond the tip of tab corner 7.

It will be seen from the foregoing that corner 9 of sheet 1 lies in the path of movement of tab 3 between the latter's two positions. Hence, if the tab is in its coplanar position (FIG. 3), corner 9 will be effective to detentingly block the tab against movement to the angular, laterally projected position of FIG. 4. Conversely, when in the latter position, the tab 3 is detentingly blocked by corner 9 against movement back to coplanar position. The tab is therefore effectively maintained in both its two positions, and the likelihood of the tab position being accidentally changed is greatly minimized. When it is desired to change the tab from either position to the other, all that need be done is apply to the tab 3 a transverse force of sufficient magnitude in the appropriate direction to overcome the detenting action of corner 9. This will cause mutual resilient flexing of the tab and corner 9, whereby the tab will snap past the corner to its other position.

It should be noted that in its angular position of FIG. 4, the underside 6 of the tab preferably abuts the extreme tip end of corner 9. Because of the inherent resiliency of the relatively stiff paper sheet or card 1 in which the tabs are formed, the tab will normally tend to return substantially to this abutting position even though it may initially have been pushed outwardly to some other position at a greater angle to the plane of the sheet. The inherent resiliency of the sheet will impose a restoring force on tab 3 in the area of the latter's hinge axis to cause the tab to swing clockwise until it abuts corner 9. Similarly, when a tab is moved from angular to coplanar position, it will tend to return substantially to coplanar position even though it may have been moved to a position beyond coplanar.

Either one of the two tab positions can be employed as the "on" or information-representing state of the tab, and the other position will represent the "off" or normal, inactive state. Preferably, however, the angular or laterally projected position of FIG. 4 is used as the information-representing condition. Referring to FIG. 1, the complete absence of any information stored in a given column 2 will be represented by all the tabs 3 of that column being in coplanar position. To store any selected digit in a column, the particular tab 3 corresponding to that digit is moved to angular position. When it is subsequently desired to reset the column to change the digital value stored therein, the previously set tab is pushed back to coplanar position; and the different tab (in the same column) corresponding to the new value is set from coplanar to angular position.

Figure 7:
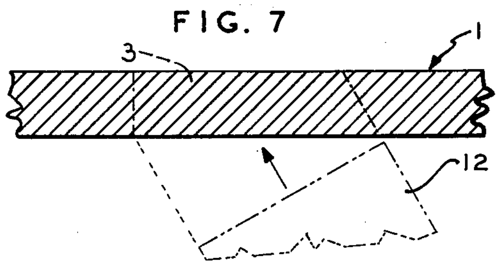
FIG. 7 is a side elevational view illustrating how the tabs are prepunched in the sheet.

The prepunched columns of tabs can conveniently and economically be preformed in the ledger sheet 1 or other record member by conventional, well-known tab punching techniques, but with the following modification. It is customary to form tabs in a sheet by punching the latter at a right angle to the plane thereof. However, as shown in FIG. 7 the tabs of the present invention are formed by tab punching members 12 arranged to punch sheet 1 at an oblique angle corresponding to the desired bevel angle of tab edge 4 and the parallel adjacent edge 8 of sheet 1. In this fashion, in a single operation the tab 3 itself is formed and the desired bevel edges are provided. It will be understood that the showing of the tab punching member 12 in FIG. 7 is diagrammatic in nature.

Figure 5:
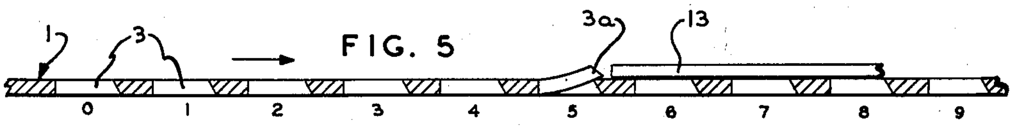
FIG. 5 is a longitudinal section through one of the tab columns, showing a set tab in the column and its relationship with an automatic sensing member.
Figure 6:
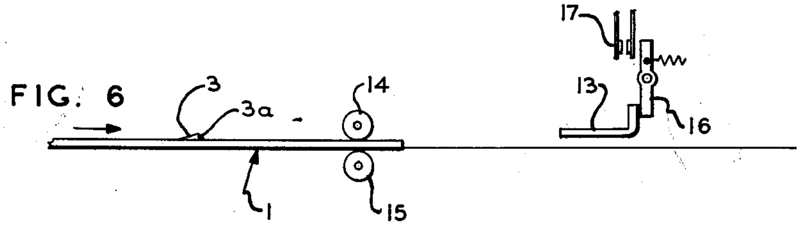
FIG. 6 is a diagrammatic view of one form of apparatus for automatically sensing the information storage device of the invention.

Any suitable techniques can be used for sensing the columns 2 of tabs 3 to automatically determine the information stored therein. FIGS. 5 and 6 illustrate one arrangement for automatically reading the columns of tabs. This arrangement utilizes the fact that the forward end portion 3*a* of any angularly set tab 3 forms a projection extending beyond one side of the record sheet 1. For each column of tabs there is provided a sensing member 13. The record sheet is moved, as by feed rollers 14, 15, relative to the sensing member 13 in the direction of length of the columns of tabs as shown by the arrow in FIG. 6. At least the forward end portion of sensing member 13 rides on or closely adjacent to the surface of sheet 1 and is in the path of movement of the related column of tabs. When the projecting forward end of a set tab in any column engages the related sensing member 13, the latter is shifted longitudinally a short distance by the tab to operate a switch 17 through an interposed lever 16. Operation of switch 17 is employed in any suitable fashion to control operation of a utilization device, e.g., a read-in apparatus for the accounting machine. It will be understood, of course, that the reading apparatus and/or record sheet will include provision for establishing a timing relationship of the movement of the record sheet past a predetermined point so that when the set tab 3 of any column 2 causes sensing member 13 to operate switch 15, the reading apparatus will know which of the tabs in the column has been sensed.

The invention can be practiced in numerous modified forms without departing from its spirit and scope. For example, although the tabs are preferably rectangular or square in shape as shown in the drawing, they may if desired be of any other suitable shape, e.g., semicircular, semielliptical, etc. Also, the encoding of information in any column can be effected by setting more than one tab, as for example by providing only four or five tabs in a column and setting different combinations of said tabs in the column.

The record member in which the columns of tabs are provided need not necessarily be a ledger or statement sheet. It can be any type of sheet record material, e.g., an elongated strip of tape. Further, the invention is not restricted to the use of a paper record member. Obviously, any sheet material which lends itself to the formation therein of the columns of detentable tabs can be used. As used in this specification and the appended claims, the term "sheet" is intended to be generic to both the relatively wide record member of the type shown in FIG. 1 and also to a relatively narrow record member such as a tape.

Other modifications and variants can be resorted to within the scope of the invention as set forth in the appended claims. It is therefore intended that the foregoing disclosure of a specific embodiment of the invention be illustrative only and not limitative of said claims.

I claim:

1. An information storage device comprising record means having a plurality of columns of information-representing members, each member being movable from a first position to a second position and from said second position to said first position, said member being secured to said record means in both said positions, and detenting means operable to block said member in at least one of said positions against movement to the other of said positions.

2. The combination according to claim 1 wherein said detenting means is operable to block said member in said first position against movement to said second position.

3. The combination according to claim 1 wherein said detenting means is operable to block said member in said second position against resetting movement to said first position.

4. The combination according to claim 1 wherein said detenting means is integral with said record means.

5. The combination according to claim 1 wherein said members are integral with said record means.

6. The combination according to claim 1 wherein said detenting means and said members are integral with said record means.

7. The combination according to claim 1 wherein said detenting means is operable to block said member in either of said positions against movement to the other of said positions.

8. The combination according to claim 7 wherein said members are integral with said record means.

9. The combination according to claim 7 wherein said detenting means is integral with said record means.

10. The combination according to claim 7 wherein said members and said detenting means are integral with said record means.

11. The combination according to claim 7 wherein said record means comprises a sheet.

12. The combination according to claim 11 wherein each member comprises a tab integral with said sheet.

13. The combination according to claim 12 wherein said detenting means comprises a portion of said sheet adjacent said tab.

14. An information storage device comprising a sheet record member having a plurality of columns of information-representing tabs formed therein, each tab being movable to and from a position wherein at least a portion of said tab projects beyond one side of said record member, and detenting means operable to restrain said tab against movement to and from said position.

15. The combination according to claim 14 wherein said detenting means comprises a projecting portion of said record member lying in the path of movement of said tab to and from said position.

16. The combination according to claim 15 wherein an edge of said record adjacent said tab is beveled, said projecting portion being defined by said beveled edge.

17. The combination according to claim 16 wherein the edge of said tab adjacent said beveled edge of said record member is correspondingly beveled.

18. An information storage device comprising a sheet member, a plurality of columns of tabs formed in said sheet member, at least a portion of the edge of each tab being beveled, the edge of said sheet member adjacent said beveled tab edge being beveled at an angle substantially parallel to said beveled tab edge.

19. The combination according to claim 18 wherein said beveled portion of the tab edge is the forward edge portion of said tab.

20. The combination according to claim 18 wherein said sheet member comprises a flexible sheet of paper.

21. The combination according to claim 19 wherein said sheet member comprises a flexible sheet of paper.

References Cited in the file of this patent

UNITED STATES PATENTS

| | | |
|---|---|---|
| 2,437,926 | Ball | Mar. 16, 1948 |
| 2,523,668 | Read | Sept. 26, 1950 |
| 2,949,226 | Lubkin | Aug. 16, 1960 |